May 12, 1970 G. A. FEDDE 3,512,142

KEEPERED PLATED WIRE MEMORY PLANE

Filed Dec. 4, 1967

INVENTOR
GEORGE A. FEDDE

BY Rene A. Kuypers
ATTORNEY

United States Patent Office 3,512,142
Patented May 12, 1970

3,512,142

KEEPERED PLATED WIRE MEMORY PLANE

George A. Fedde, Norristown, Pa., assignor to Sperry Rand Corporation, New York, N.Y., a corporation of Delaware Filed Dec. 4, 1967, Ser. No. 687,520
Int. Cl. G11c *11/06, 11/14, 5/08*
U.S. Cl. 340—174 10 Claims

ABSTRACT OF THE DISCLOSURE

A keepered plated wire memory plane wherein the magnetic keepers are halves of a toroidal ferrite core located on each side of a plated wire in which the bit locations are determined by perforations in the substrate.

This invention relates to a plated wire memory plane arrangement which utilizes low cost magnetic keepers surrounding the various bit positions (i.e., where a binary "1" or "0" is stored. The keeper may be, for example, a 30 mil toroidal ferrite core that has been sintered, bonded to a substrate and cut in half. The halves of the core keepers are positioned around the bit position of the wire so that the wire and the keepers are coplanar. Holes are drilled, punched or chemically milled in the substrate immediately below and within the opening of the toroidal ferrite core so that a drive line may be threaded therethrough so that the latter is juxtaposed to the plated wire. This arrangement at a particular bit position along a plated wire provides a strong concentrated magnetic field around the bit position when the drive line is energized during a memory read or write cycle. It also provides a low reluctance closure path for the magnetization of the memory element when it is switched during a read or write cycle. The arrangement of the discrete keepers at the bit locations provides a memory wherein the inductance for both the word lines and the bit lines is at a minimum. The memory of the instant invention is also arranged in a zig zag manner that enables short sections of plated wires to be utilized in fabricating the memory. This materially increases the yield of the memory manufacture and lowers its cost.

BACKGROUND OF THE INVENTION

This invention relates in general to the memory art and more particularly to plated wire memories. The subject invention further relates to providing a magnetic keeper arrangement coplanar with the said plated wires in the memory.

In known prior art thin film memory devices of the planar and plated wire types, a ferrite keeper has been deposited along the entire length of the drive line. Such a prior art arrangement was shown and described in the 1963 Proceedings of the Intermag Conference and was described in the article entitled "Large High Speed, DRO Film Memories" by A. V. Pohm, et al. starting on page 9–5–2. This prior art device has serious shortcomings in that the drive line with a keeper extending along its entire length has a high value of inductance.

Another shortcoming of known prior art resides in the fact that a continuous sheet of high permeable material is used as the magnetic keeper. The continuous sheet provides holes in various locations for reducing the transfer of flux between adjoining memory elements. However, in view of the many parallel paths to which the flux can travel around the holes, the concentration of flux around the selected bit position is less than desirable. Furthermore, the sheet of high permeable material would not perform satisfactorily with a film formed on a thick substrate such as plated wire since the memory and the keeper would not be coplanar. In other words, a sheet keeper used in conjunction with a thick memory device will not perform satisfactorily since the keeper is not close enough to the bit position. A device which incorporates the above-mentioned high permeable sheet in conjunction with a planar thin film memory element is shown and described in patent application Ser. No. 504,-503, now abandoned.

SUMMARY OF THE INVENTION

This invention relates to a keepered plated wire memory plane wherein the associated drive lines and plated wire bit lines are characterized by a low value of inductance. In order to provide this low inductance memory, magnetic keepers which in one form are halves of a toroidal ferrite core are positioned on each side of a plated wire location and are coplanar therewith. This arrangement provides a strong localized magnetic field when an associated drive line is energized at the bit position during a memory read or write cycle. Accordingly, the drive line may be energized for an entire word which incorporates many bit positions with less drive voltage because of the instant keeper arrangement.

This invention also provides a memory arrangement which may utilize short sections of plated wire. This feature enables the manufacturing yield of plated wire to materially rise since plated wire lengths which were not long enough for prior art plated wire memories can readily be used in the instant memory arrangement.

DESCRIPTION OF THE PREFERRED EMBODIMENTS

Figures 1, 2, 3, 4:
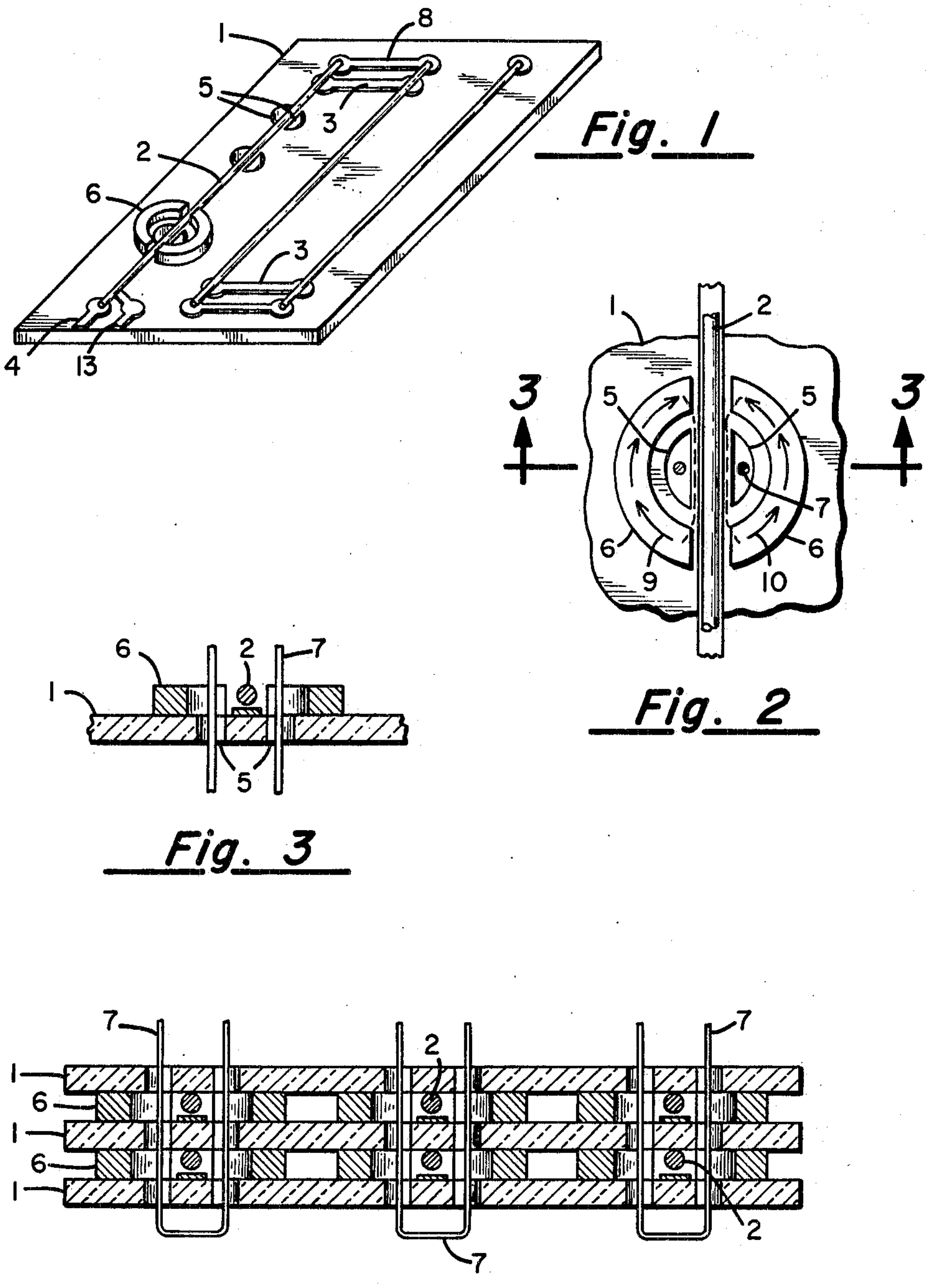
FIG. 1 depicts plated wire positioned on a substrate and further shows the relative position of the toroidal keepers and the perforations with respect to the wire.
FIG. 2 shows a relative relationship between the ferrite keeper, the plated wire and the perforations with respect to one another.
FIG. 3 depicts a front view of FIG. 2.
FIG. 4 shows a view of the overall memory stack assembly comprising a plurality of planes wherein each plane includes a substrate, a keeper, plated wires and drive lines.

Referring now in particular to FIG. 1, the substrate 1 comprises a support dielectric which might be made of glass, glass epoxy, ceramic, phenolic, insulated aluminum, copper or other metal. Positioned upon the support 1 are a plurality of relatively short plated wire sections 2 which may be in a certain embodiment 9 inches or less in length. The plated wires 2 are connected to one another by means of the connecting line 8 which may be an etched conducting pad. The plated wires, in one embodiment, are 5 mil diameter copper-beryllium substrates upon which are coated a thin magnetic film on the order of 10,000 Angstroms. The thin magnetic film coated on the wire substrate is deposited in the presence of a circumferential magnetic field thereby giving the thin film the property of uniaxial anisotropy. In other words, the magnetic thin film has an "easy" axis which is circumferential aind a "hard" axis which is longitudinal. The magnetization vectors of the thin film are oriented in a clockwise or counterclockwise orientation around the "easy" axis and depending upon the orientation there is stored a binary "1" or "0."

Three plated wires 2 are shown positioned upon the substrate 1 and joined to one another by the connecting means 8. The support 1 may include grooves which are chemically milled for positioning the plated wires 2 therein. The ends of the plated wire 2 are terminated to the etched conductor pad 4. This enables the plated wires 2 to be connected to external circuits (not shown). The plated wire return path 3 is partially shown and is connected to the pad 13. This return path may be an etched circuit which is parallel and directly below the plated wire.

The short plated wire sections 2 are shown connected in a zig-zag manner. This is significant in that short sections which in prior art plated wire memory devices could not be used are satisfactorily utilized in accordance with this invention. This factor increases the yield in the manufacture of plated wires and thereby materially reduces the cost per bit of the memory.

Located on opposite sides of the various bit positions along the plated wire 2 are the perforations 5 (only two of which are shown for simplicity's sake). The perforations 5 are etched, punched or drilled holes for a single or a multi-turn word lines and their function will be described in greater detail with respect to FIGS. 3 and 4.

Also positioned upon the support 1 and on either side of the various bit positions along plated wire 2 is the keeper 6 (only one of which is shown). The keeper 6 is a high permeability material which has a low coercive force ($Hc$). In the embodiment shown, the keeper 6 is a toroidal ferrite core which has been sawed in half so that one half is positioned on one side and the other half along the other side of a bit position along the plated wire 2. These core halves are sintered and bonded to the substrate 1 preferably before cutting. By way of example, the toroidal ferrite core may have an outside diameter of 50 mil and an inside diameter of 30 mil and a height of 10 mil.

The keeper 6 may take other forms than that previously described. Thus, the keeper may also be a screened slurry of ferrite powder and binder which is cured to the substrate.

Referring now to FIG. 2, there is shown an enlarged top view at a particular bit position along the plated wire 2. This view shows in detail the relationship between the plated wire 2, the perforations 5 and the toroidal ferrite core halves 6. As was previously mentioned, the keeper 6 is arranged around a bit position or a location where a "1" or "0" is stored. One half of the toroidal ferrite core is positioned around the perforation 5 on one side of the plated wire 2 and the other half is positioned on the other side thereof and surrounding the second perforation. The perforations 5 in the support 1 are arranged with respect to the opening of the core halves 6 so that a drive line may be readily threaded therethrough. This may be envisioned more clearly by referring to FIG. 3, which is a front view of FIG. 2. FIG. 3 shows that the perforations 5 are within the opening provided by the core keepers 6.

Referring now to FIG. 4, there is shown a stack assembly utilizing three memory planes. Interposed between each support 1 and at the bit position are a plurality of toroidal core keepers surrounding the plated wires 2. Threaded through the perforations 5 in each of the supports 1 and the openings in the cores are the drive lines 7. The initial and terminating portions of each respective drive line 7 is connected to a word line termination and diode or transistor selection circuit (not shown) which would be located on the topmost support 1. As is well understood in the art, a word line 7 is juxtaposed to a bit position along the plated wire and a memory word comprises a plurality of such bits along the drive line. As an example, a memory word may comprise 9 bits. In FIG. 4, there is shown three words each of which has a length of two bits. A word line 7 may be a single or multiturn type. Furthermore, the word line 7 may be round or flat configuration. A word line 7 in FIG. 4 is an example of a single turn word line.

In operation, a selected word line 7 is energized during a memory read or write cycle. In FIG. 4, it will be assumed that when a particular line 7 is energized, current flows down the leftmost side of the drive line and returns in the upward direction in the rightmost side to complete the circuit. Referencing the same current directions to FIG. 2, it can be imagined that current flows downward into the paper through the word line (not shown) positioned in the left hand perforation 5 and returns out of the paper through the right side of the same word line 7. Accordingly, when the word line 7 is energized with a current direction as just described, it will generate in accordance with Amperes Law a magnetic field 9 and 10. As can be readily seen, the energizing of a word line 7 causes an intense and confined magnetic field to be generated in the area along the plated wire 2 which contains the stored binary information. This intense magnetic field results from the fact that the toroidal core sections 6 are a high permeability material and therefore the magnetic field which is generated becomes concentrated and confined therein in preference to the surrounding air which is a low permeable medium. However, it should be noted that the magnetic field after passing through the core half closes through the magnetic coating on the wire and air. The flux does not close through the other core half since the flux therein opposes it. In other words, the flux on each side of the bit position provides a magnetic circuit path around the perforation 5 with which it is most closely associated. As is well known, the magnetic field 9 and 10 causes magnetization vectors oriented in a clockwise or counter-clockwise direction on the "easy" axis to be rotated to some angle less than 90° in a NDRO mode of operation. In a read cycle, this operation induces a signal in the plated wire 2 which is detected by a sense amplifier (not shown) connected thereto. The polarity of this signal determines whether a binary "0" or "1" is stored thereat. During the write cycle of operation, after the magnetization vectors are rotated to some angle less than 90° by the energizing of the drive line 7 a bit steering current is sent down the wire 2 and the direction thereof determines whether a binary "1" or "0" will be recorded at the bit position.

It should be noted that the keeper arrangement of this invention provides a word line whose inductance is relatively small. This can be appreciated by referring to FIG. 4. In this figure it can be seen that the small discrete keepers 6 are utilized only at the various bit positions as opposed to prior art techniques wherein the keeper is along the entire length of the drive lines 7. The lower inductance value of the instant invention can be readily understood in the light of the formula, $$L=\mu N^2\frac{A}{1}$$

Accordingly, assuming that all the dimensions remain the same (i.e., N, A and 1 the average $\mu$ is less since keepers are used only at discrete locations. The lower inductance of the drive line is significant since the higher the inductance, the greater the driving voltage that must be applied to drive line 7 to generate a required rate of change of current (i.e., $E=Ldi/dt$).

The discrete keepers 6 provide a plate wire 2 which is characterized by a low value of inductance. This results from the fact that there is no excess of low permeability material between the bit positions as in the above mentioned prior art device.

The ferrite keepers 6 of the instant invention as can be seen particularly in FIGS. 3 and 4 are very close to the plated wires 2 and are coplanar therewith. The ferrite pieces can be sintered (i.e., heating and cooling amorphous particles to cause them to coalesce into a solid mass). Furthermore, since the keepers 6 are in discrete parts and supported by a common substrate 1, there is provided greater flexibility in the choice of materials and the methods of keeper formation and application.

In a memory embodiment, the plated wire segments 2 are 9 inches long or less and 128 bits per wire segment or 16 bits per inch are stored thereon. In a plane (i.e., the substrate 1, eight segments of the plated wires 2 with one half inch spacing between parallel segments and the keeper 6) 9 inches by 4.5 inches, there are 1,024 bits. The plane stacking factor is 50 per inch. In a plane stack 3.5 inches high, 9 inches long and 45 inches wide, there are a total of 1024 words (bytes) of 160 bits per word. This is usually organized as 16,384 words (bytes) of 10 bits (including parity and spare) each.

The embodiments of the invention in which an exclusive property or privilege is claimed are defined as follows:

1. The memory combination comprising:

(a) a support substrate;

(b) a plurality of plated wire sections positioned on said support, said sections being spaced from one another in parallel fashion, said sections further being connected to one another to form a continuous conductive path, said plated wires further having a magnetizable coating with an easy axis which is circumferential and a hard axis which is longitudinal so that binary bits are stored along its length;

(c) perforations formed through said support on either side of said bit positions along said continuous length of plated wire sections (d) respective drive means having a forward and return means juxtaposed to each different bit position, said forward means of a respective drive means being arranged through a perforation on one side and said return means being positioned through the directly opposite perforation, said respective drive means being thereby juxtaposed to an associated bit position;

(e) discrete, high permeability material positioned around each perforation, said material being substantially coplanar with said wire sections, said discrete low permeability material at said bit positions providing a memory device with a minimum of inductance.

2. The combination in accordance with claim 1 wherein said discrete, high permeability material comprises a half section of a ferrite core.

3. The combination in accordance with claim 1 wherein said discrete, high permeability material comprises a screened slurry of ferrite powder and binder which is cured to the substrate.

4. The substrate in accordance with claim 1 wherein said respective means comprises a single-turn solenoid.

5. The combination in accordance with claim 1 wherein said substrate comprises a dielectric material.

6. The combination in accordance with claim 1 wherein a plurality of substrates including plated wires and high permeability material are arranged in a stack assembly, the perforation in said substrates being aligned for positioning of the respective drive means therethrough.

7. The combination in accordance with claim 1 wherein circuits are etched parallel and directly below the said plated wire sections to form return paths.

8. The combination in accordance with claim 1 wherein said plated wire sections comprise a copper beryllium substrate upon which is positioned a ferromagnetic coating.

9. The combination in accordance with claim 8 wherein said ferromagnetic coating comprises a composition having the approximate proportions of 80% nickel and 20% iron.

10. The combination in accordance with claim 8 wherein said substrate is approximately 5 mils in diameter.

References Cited

UNITED STATES PATENTS 3,435,435 3/1969 Bergman et al. ------- 340—174

BERNARD KONICK, Primary Examiner

S. B. POKOTILOW, Assistant Examiner